US007840426B2

(12) United States Patent
Daughtrey et al.

(10) Patent No.: US 7,840,426 B2
(45) Date of Patent: *Nov. 23, 2010

(54) FLEXIBLE-DATE TRAVEL QUERIES

(75) Inventors: Rodney S. Daughtrey, Cambridge, MA (US); Carl G. Demarcken, Arlington, MA (US); Justin A. Boyan, Providence, RI (US)

(73) Assignee: ITA Software, Inc., Cambridge, MA (US)

( * ) Notice: Subject to any disclaimer, the term of this patent is extended or adjusted under 35 U.S.C. 154(b) by 215 days.

This patent is subject to a terminal disclaimer.

(21) Appl. No.: 12/044,028

(22) Filed: Mar. 7, 2008

(65) Prior Publication Data

US 2008/0222566 A1 Sep. 11, 2008

Related U.S. Application Data

(63) Continuation of application No. 10/272,521, filed on Oct. 16, 2002, now Pat. No. 7,346,526.

(51) Int. Cl.
*G06Q 10/00* (2006.01)
(52) U.S. Cl. .......................................................... 705/5
(58) Field of Classification Search ................ 705/1.1, 705/5
See application file for complete search history.

(56) References Cited

U.S. PATENT DOCUMENTS

| 6,304,850 | B1 * | 10/2001 | Keller et al. ................... 705/5 |
| 6,397,212 | B1 * | 5/2002 | Biffar .......................... 707/704 |
| 2001/0034625 | A1 * | 10/2001 | Kwoh ............................ 705/6 |

* cited by examiner

*Primary Examiner*—Shannon S Saliard
(74) *Attorney, Agent, or Firm*—Fish & Richardson P.C.

(57) ABSTRACT

Techniques for processing flexible-date queries are described. Techniques include a interface to enter a flexible date query including a description of a traveler's desired stay at a destination. A user receives a set of solutions that satisfy the flexible date query in the form of a calendar. The set of solutions can be stored in a database for eventual retrieval of a subset of the set of solutions to render to a user.

41 Claims, 9 Drawing Sheets

FIG. 5

June 8 departures

| Airlines | Delta Air Lines | United Air Lines | Continental Air Lines | US Airways | American Airlines | America West | Sun Country | Multiple airlines |
|---|---|---|---|---|---|---|---|---|
| Options from $309 | From $309 | From $2324 | From | From | From | From $321 | | |
| Nonstop | - | - | - | From $315 | From $315 | - | | - |
| One stop | From $316 | From | From | | | From | | From |

June 8 departures: All options

| Sort by → | Cost | Airline | From/To | Stops | Date | Flight times | Duration | Class | Warnings |
|---|---|---|---|---|---|---|---|---|---|
| 1 Details | $309 | Delta | BOS to LAX / LAX to BOS | nonstop / nonstop | Fri, June 8 / Wed–June 13 | 5:55p-9:10p / 7:35a-4:10p | 6h 15m / 5h 35m | Coach / Coach | unknown seat availability |
| 2 Details | $312 | Continental | BOS to LAX / LAX to BOS | EWR / PHX, IAH | Fri, June 8 / Wed–June 13 | 1:00p-6:45p / 11:13a-11:45p | 8h 45m / 9h 32m | Coach / Coach | unknown seat availability |
| 3 Details | $315 | US Airways | BOS to LAX / LAX to BOS | PIT / PIT | Fri, June 8 / Thur–Fri, June 14–15 | 12:05p-4:30p / 1:35p-12:08a | 7h 25m / 7h 33m | Coach / Coach | unknown seat availability |
| 4 Details | $315 | American | BOS to LAX / LAX to BOS | JFK / nonstop | Fri, June 8 / Thur, June 14 | 2:30p-8:07p / 7:45a-4:23p | 8h 37m / 5h 38m | Coach / Coach | unknown seat availability prop plane segment |
| 5 Details | $316 | United | BOS to LAX / LAX to BOS | ORD / nonstop | Fri, June 8 / Thur–Fri, June 14–15 | 1:30p-7:46p / 10:25p-6:47a | 9h 16m / 5h 22m | Coach / Coach | unknown seat availability overnight flight |
| 6 Details | $321 | America West | BOS to LAX / LAX to BOS | PHX / LAS | Fri, June 8 / Wed–Thur, June 13–14 | 9:52a-4:01p / 8:00p-7:29a | 9h 9m / 8h 29m | Coach / Coach | unknown seat availability overnight flight |

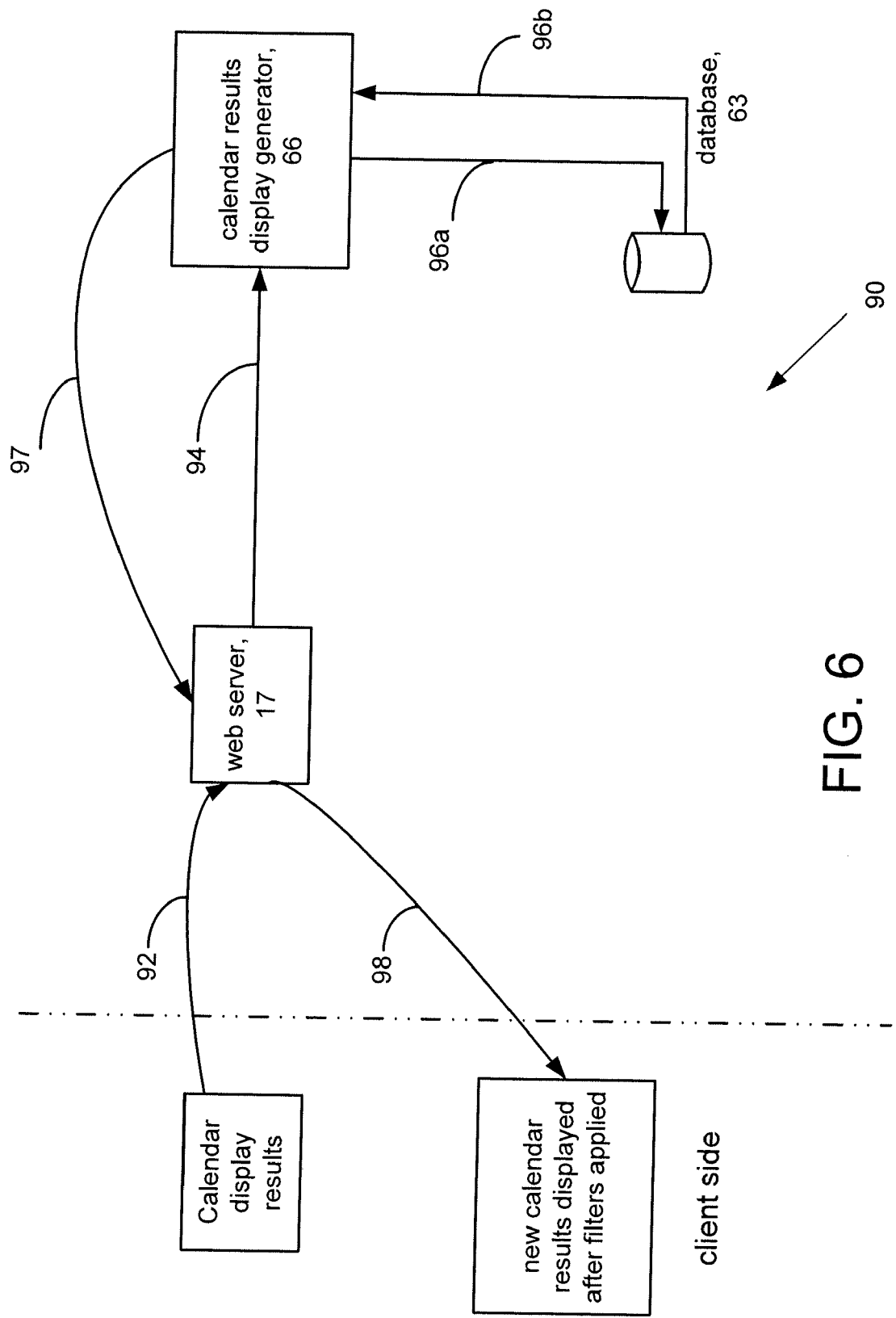

FIG. 8

FLEXIBLE-DATE TRAVEL QUERIES

This application is a continuation (and claims the benefit of priority under 35 U.S.C. 120) of U.S. application Ser. No. 10/272,521, filed Oct. 16, 2002 (now U.S. Pat. No. 7,346,526). The disclosure of the prior application is considered part of (and is incorporated by reference in) the disclosure of this application.

BACKGROUND

This invention relates to travel scheduling and pricing, and more particularly to processing queries for air travel planning systems.

In travel planning such as for air travel scheduling and pricing, low-fare-search queries are posed by users from travel agent systems, airline reservation agent systems, travel web sites, and airline-specific web sites. Low-fare-search (LFS) queries typically include origin and destination information, time constraints and additional information including passenger profile and travel preferences. Travel planning computer systems respond to these LFS queries and typically return a list of possible tickets, each having flight and price information. Some systems return answers in a compact form such as through a pricing graph.

Most travel planning systems require each input LFS query to specify a narrow range of possible travel dates, e.g., one-day range, such as "depart anytime on August 2", or perhaps a slightly longer range, such as "return on either August 9 or 10." Most systems do not permit queries with more flexibility in their travel dates such as a query, "depart anytime in August."

Some travel websites such as Travelocity® and Expedia®, provide a type of flexible-date query in the form of a "fare calendar." The fare calendar technique requires a user to select one fare (for example, the United Airlines BOS-LAX fare with basis code QE14NR). The site will display a calendar indicating the available travel dates for flights using that particular fare.

SUMMARY

There are several difficulties with handling "flexible travel date" queries. One difficulty is that the lack of precise date constraints imposes extensive computational requirements on the search engine answering the query. An airfare search can involve many flight combinations and correspondingly availability questions, fares, and rules to process. Another difficulty resides in a user interface. The user interface should allow users to easily pose queries that match their schedule's flexibility. In addition, the user interface should present query results in an informative and understandable manner. Another problem is that fare calendar technique, which requires the user to select a fare, is basically a trial-and-error approach makes the use of flexible date queries very time consuming and cumbersome for the user.

According to an aspect of the invention, an interface for travel planning includes a field that allows a user to enter a layover description that includes the duration of the layover at a destination.

According to an additional aspect of the invention, a method of processing flexible-date queries includes sending a flexible date query including a description of a traveler's desired layover at a destination, receiving a set of solutions that satisfy the flexible date query from executing the query using a search engine, and storing the set of solutions in a database. The method also includes retrieving a subset of the set of solutions to render to a user.

According to an additional aspect of the invention, an interface for travel planing includes a depiction of a calendar that represents in cells of the calendar search results for which a solution is found by using information pertaining to a complete, validated solution in each calendar cell for which a solution was generated.

According to an additional aspect of the invention, a computer program product residing on a computer readable medium for processing flexible-date queries includes instructions to cause a processor to send a flexible date query including a description of a traveler's desired layover at a destination, receive a set of solutions that satisfy the flexible date query and store the set of solutions in a database. The computer program product also includes instructions to retrieve a subset of the set of solutions to render to a user.

Unlike prior approaches to handle flexible date queries the present techniques avoid a long trial-and-error process of investigating fares and looking for a fare that provides availability on preferred dates. This present technique provides the possibility of using fare combinations (e.g., BOS-CHI plus CHI-LAX) or multiple airlines, either of which might result in a cheaper price than any available single fare.

The techniques provide a query form that allows users to specify a flexible range of outbound and return dates for their travel plans, using a specification of their preferred layover length. The technique stores results in a database for later retrieval and display. Results are conveyed to a user by use of a "results calendar" which displays an overview of the solutions on a calendar. On days for which results have been requested, information such as that day's cheapest available ticket price will be shown in the corresponding grid cell of the calendar. The information displayed in each grid cell of the calendar corresponds to properties of complete travel solutions, for which all rules and optionally availability have been checked, and for which a ticket can be issued. No trial-and-error on the part of the user is required.

Users can interact with the results calendar in a number of ways. For example, the user can use filters to select or deselect travel on certain airlines, travel involving one or more stops, etc., resulting in an update of the prices displayed in the calendar cells. The result calendar provides the ability to click on the price associated with a given day, and quickly see an overview of flight choices on that day, as well as a sampling of full, validated ticket options. Also the results calendar provides the ability to extend the query dates beyond those originally specified by clicking directly on the calendar. Special parameter settings can be used to control the performance of the underlying fare search engine.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 is a diagram depicting a results interface.

FIGS. 6 and 7 are flow diagrams depicting alternative ways to produce data for the results interface.

FIG. 8 is a diagram depicting the results interface using user-selectable filters.

DETAILED DESCRIPTION

Figure 1:
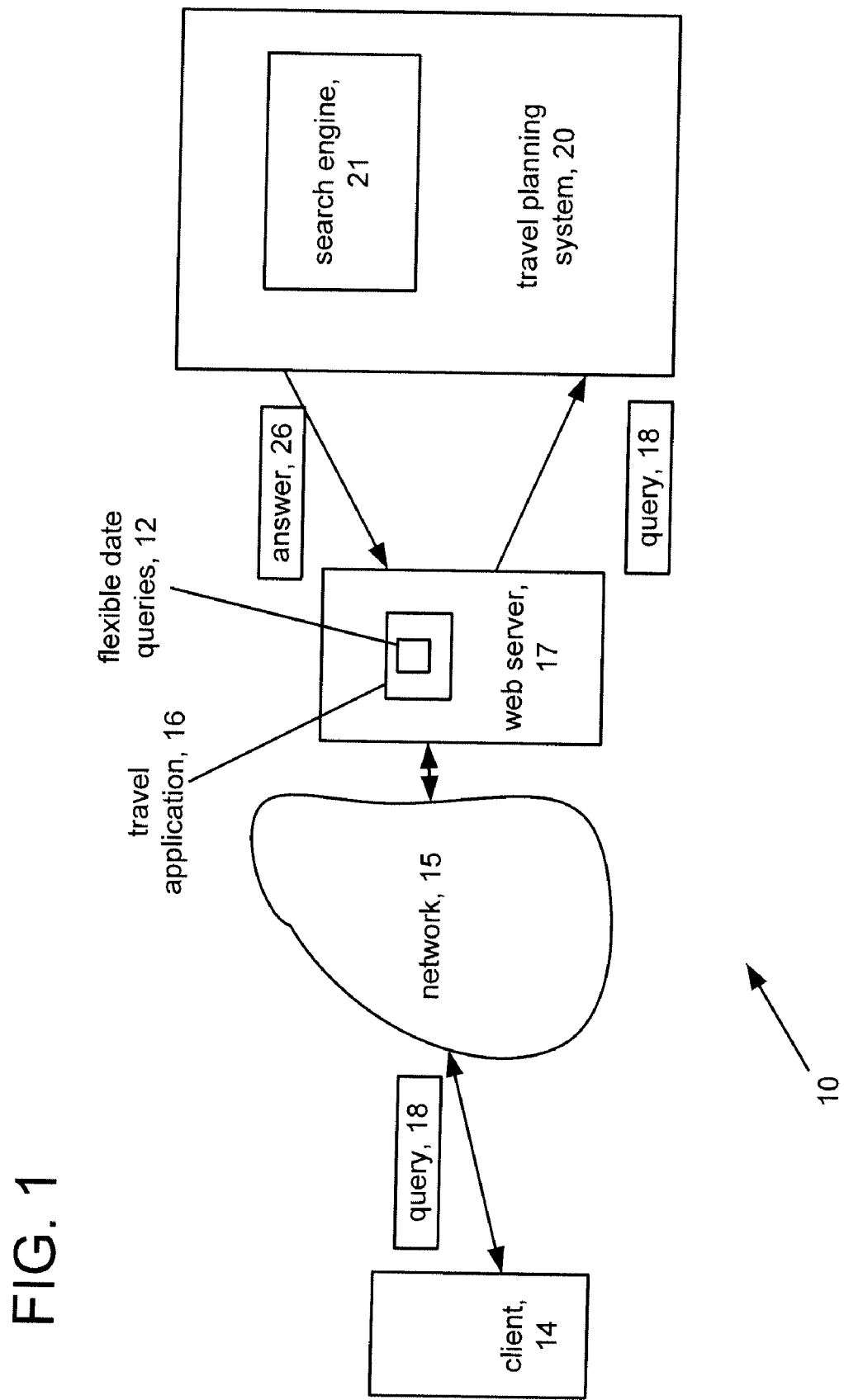
FIG. 1 is a block diagram of a travel planning arrangement.

Referring to FIG. 1, an arrangement 10 for travel planning includes a process 12 to process flexible-date queries. A user such as a traveler, travel agent or airline reservation agent enters trip information typically including date and airport (i.e. origin and destination) information from a client system 14 into a travel application 16. The client 14 can run a browser or other interface and can be a travel agent terminal, an Internet web browser connected to a travel web site, and so forth. Queries 18 from the client are fed via a network 15 to the travel application. Network 15 can be any type of network such as a public network such as the Internet or telephone system or a private network such as a local area network (LAN), wide area network (WAN), virtual private network (VPN), and so forth. The travel application 16 typically resides on a web server 17. To process flexible-date queries, the travel application 16 allows a wide range of travel dates to be specified.

The travel application 16 interprets queries 18 that arrive from the client 14, sends the queries 18 to a travel planning computer 20 and, organizes the results from the travel computer 20 into a formatted output such as HTML, and sends the results back to the client 14. The travel application 16 composes query information into an appropriately formatted query, e.g., a low-fare-search query 18, which is sent to a travel planning system 20. The travel planning system 20 includes a search engine or search process 21 that searches for flight and fare combinations that satisfy the flexible date query. The search performed by the search engine 21 in the travel planning systems 20 can use any of several know techniques, possible modified to include a query splitting process described below in FIG. 9.

Figure 2:
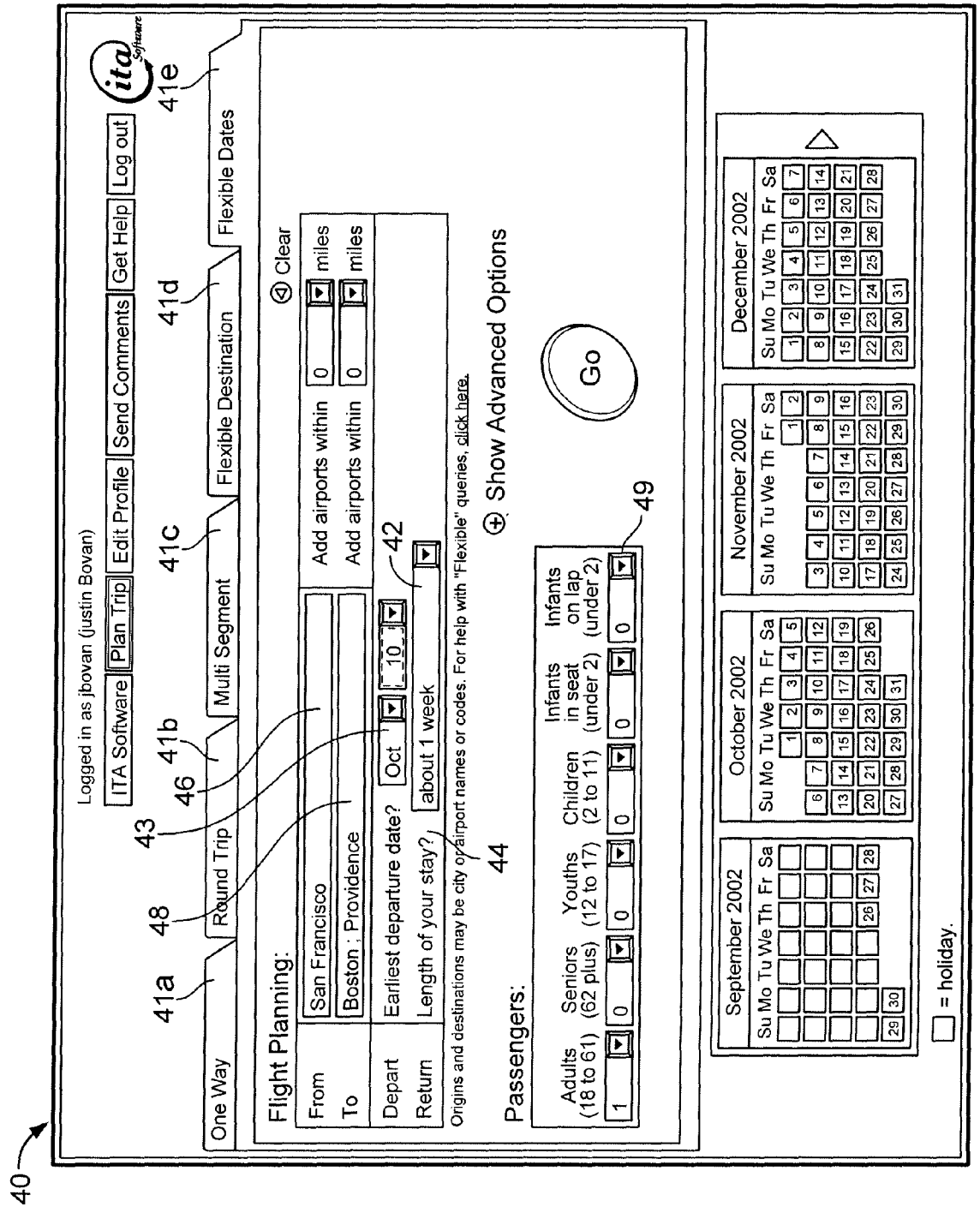
FIG. 2 is a interface form for flexible date queries.

Referring to FIG. 2, a graphical user interface 40 that is generated by the travel application 16 controls interface, query specification, search engine parameter settings, results database management, and results presentation for processing travel queries. In one implementation, the GUI 40 has separate panes for processing one-way (pane 41a), round-trip (pane 41b), multi-segment (pane 41c), flexible destination (pane 41d), and flexible-date (pane 41d) queries.

The travel application 16 controls the input specification for the query. One approach would be to request four dates to be input by the user: earliest possible departure date, latest possible departure date, earliest possible return date, and latest possible return date. However, this approach would result in a number of trip combinations proportional to the product of the outbound date range and the return date range. In many circumstances where there are large values in those ranges the computation needed could overburden the search engine. For example, a user who proposed departing "anytime in July" and returning "anytime in August", assuming 100 flight combinations per day serving the user's requested airports, would translate into a search request of 31*100*31*100 or nearly ten million flight combinations.

In practice a travelers' trips are constrained in duration, even if they are flexible in departure date. Practical queries of this type resemble the following:

"visit Daytona Beach for about a week sometime this winter"

"visit Burlington for a short weekend in October"

"go to Chicago for a day trip some day next week"

"get a one-way ticket to San Francisco anytime this month"

In each of these examples, while the range of possible travel dates is quite wide, the duration or length of time spent at the destination is specified with some precision. Accordingly, the graphical user interface 40 pane 41e for providing flexible-date queries includes a field 42 where users specify the approximate duration of the trip. Users may optionally enter an outbound date range. The GUI 40 can also include a field for entering an earliest departure date (not shown) and a field for entering a Latest departure date 43. The fields for entering an earliest departure date and latest departure date are optional fields. If an outbound range is not entered a default outbound date range can be used. One such default is "departing anytime between tomorrow and one month from today."

The user specifies the desired duration in one of a number of manners that can be accessed via a scroll bar on the field 44. The forms of layover length include "a day trip", "weekend trip", "month-long trip", and so forth. This specification is selected from a menu or entered in a text field. The GUI 40 also includes a origin field 46 and a destination field 48, each of which allows inclusion of additional airports with a user specified number of miles from the origin or destination. The GUI can also have fields 49 for specifying profile information, e.g., number of adults, seniors, youths, children, infants (in seat or lap). A "Go" button launches the query and sends it to the travel application 16 for transmission to the travel planning system 20.

The duration specification may include additional constraints beyond the length of the stay. For example, a layover specification of "one weekend" could be interpreted to mean a layover of duration 1 or 2 nights, departing only on a Friday or Saturday. A layover specification of "one-day business trip" could be interpreted to mean a same-day return, departing only on a non-holiday weekday. Each additional constraint reduces the computational burden on the search engine, increasing the number of answers that can be generated within a given search time. Furthermore, the additional constraints make it easier for the user to find a useful ticket option among the results presented. The GUI can also include user specific choices for layover length, e.g., under advanced options such as "one-way ticket only", "one-day business trip", "two-day business trip", "one weekend", "one long weekend", "weekend to weekend", "about one week", "about two weeks", "about three weeks", "about one month", and so forth (not shown).

With the layover length specified, the computational burden on the search engine is significantly reduced. For example, if a user proposed departing "anytime in July" and returning after a layover of "about one month", assuming a range of 29-31 days for the layover and again assuming 100 flight combinations per day, the number of flight combinations in the search request would be 31*100*3*100—less than a million, for a tenfold savings over the approach mentioned above.

Figure 3:
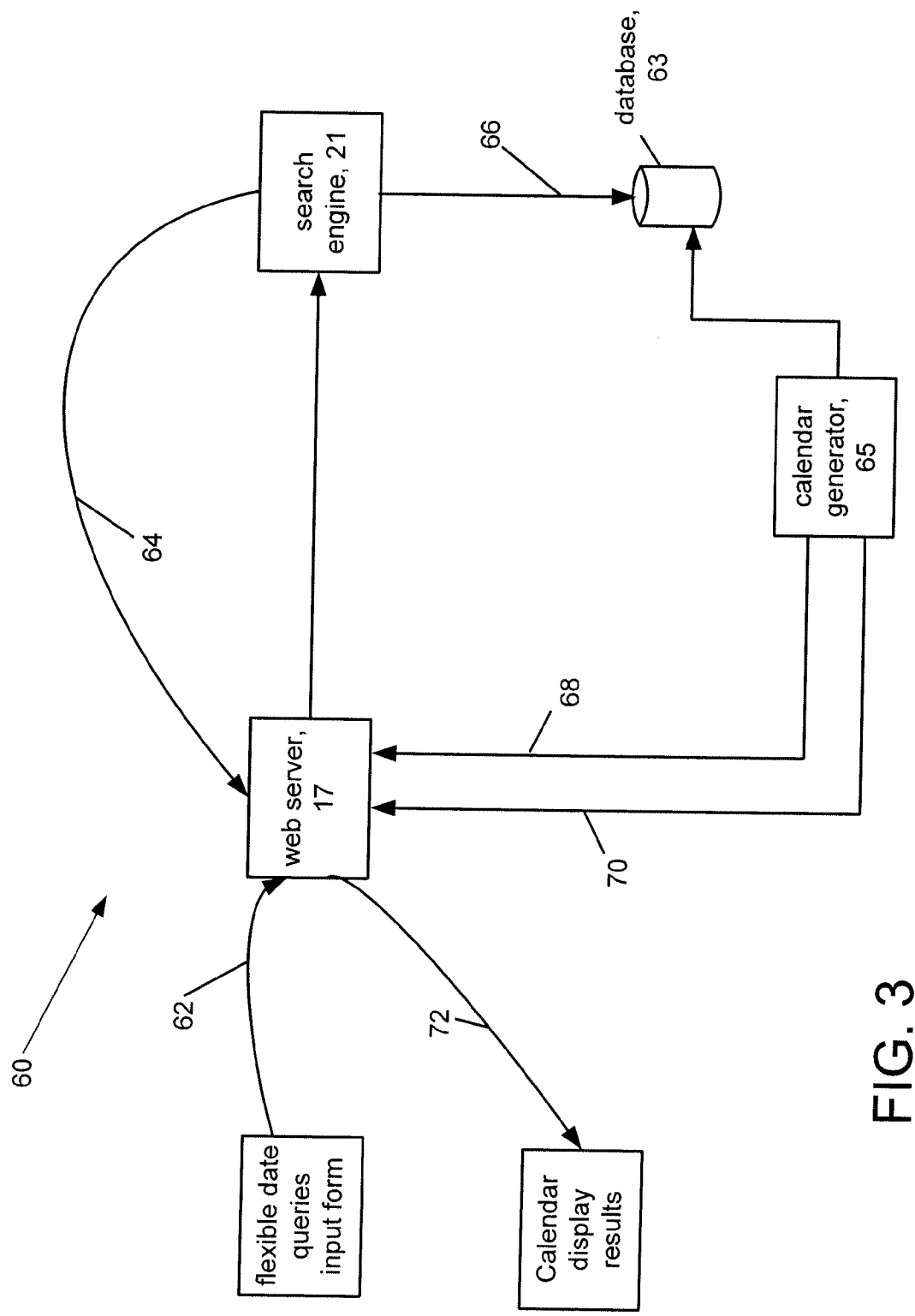
FIG. 3 is a block diagram depicting actions in an initial query.

Referring now to FIG. 3, the travel application 16 includes a process 60 for handling flexible date queries. The process 60 sends 62 a flexible-date query to a search engine 21 (See also FIG. 1) via web server 17. In response to receiving the flexible date query, the search engine 21 produces a list of many (perhaps hundreds or thousands) solutions. Each solution comprises a combination of flights satisfying the user's requested parameters (airports, passengers, preferred airline, etc.), within the requested date range and the length of stay. Moreover, each flight combination is matched with a set of fares, and those fares have been validated by checking all fare rules and seat availability, with taxes also having been applied. Hence, associated with each solution is a price representing the complete price of the ticket, ready for immediate booking. The set of solutions is stored 66 in a database on disk 63. The database 63 can be a collection of formatted text files stored in a flat file system. Other implementations such as transactional databases could also be used. The solutions are stored in the database 63, which serves as the data source for display and manipulation of a results calendar. The search engine 21 informs 64 the web server 17 that solutions have been written.

The travel application 16 queries the database 63 to retrieve 68 the "best" solution given a current set of user-specified filters, for each departure date. By default, the notion of "best" is defined simply as the cheapest among all solutions computed and which are not filtered out by user specified criteria. Other definitions for "best" can be defined, often based on the initial query parameters specified by the user. For example, if the user specified that only first class service solutions were desired, then "best" might be defined as the cheapest first-class solutions, rather than the cheapest solutions in any class of service.

The travel application 16 has a calendar generator 65 that generates 70 a results calendar, highlighting properties of the best solution(s) corresponding to each departure date, and sends 72 the results calendar to the user. The user may select or modify filters (for example, to filter out solutions involving particular airlines or solutions involving prop planes). The process 60 returns to retrieve (again 68) another set of best solutions, by retrieving from its database only the subset of solutions matching the new filter criteria. The user may augment the query (again 62), either by requesting additional solutions for a date that has already been considered, or by asking the system to extend the permissible date range to new dates. In either case the system writes (again 66) newly discovered solutions to the solution set stored in the database 63. The search engine 21 informs (again 64) the web server 17 that solutions have been written.

The solutions are stored in the database 63 for the duration of a user's session with the website. However, an extension could provide for the database 63 to be maintained across multiple users' sessions. This extension would involve inserting an additional action at the beginning process, e.g., the travel application checks database to see whether solutions to the user's query have already been stored; if so, then retrieve best solutions without having the search engine perform another search.

Because airline fares and seat availability change frequently, solutions are either pruned from the database 63 within a few hours of their having been generated, or refreshed by a follow-up query to the search engine 1, so as to avoid presenting solutions on the "results calendar" display that cannot be booked. The system could also regularly pose queries to the search engine (e.g., during times of excess search-engine capacity) for the purpose of "stocking" the database with up-to-date solution sets in commonly traveled markets.

The Results Calendar

Potentially, hundreds or thousands of travel solutions, spanning many different departure dates, are stored in the database 63. The system 10 (FIG. 1) summarizes these travel solutions in a manner that the end user can comprehend. The summary is presented as a calendar spanning all months covered by the solution set. In a calendar grid cell corresponding to each day on which a set of valid solutions depart, the process provides one or more properties of the solution set. These properties may include one or more of the following:

The price of the best solution departing on that day, where "best" refers to the cheapest ticket meeting the user's cabin-class preference and other filters;

The primary airline(s) used by the best solutions departing on that day (represented by the airline's name, icon, or two-letter code);

The number of stops in the best solution departing on that day; and

An indication of the cabin class, origin and departure airports and times, and equipment type (for example, an icon of a propeller to denote a prop plane) associated with the best solution departing on that day.

Figure 4:
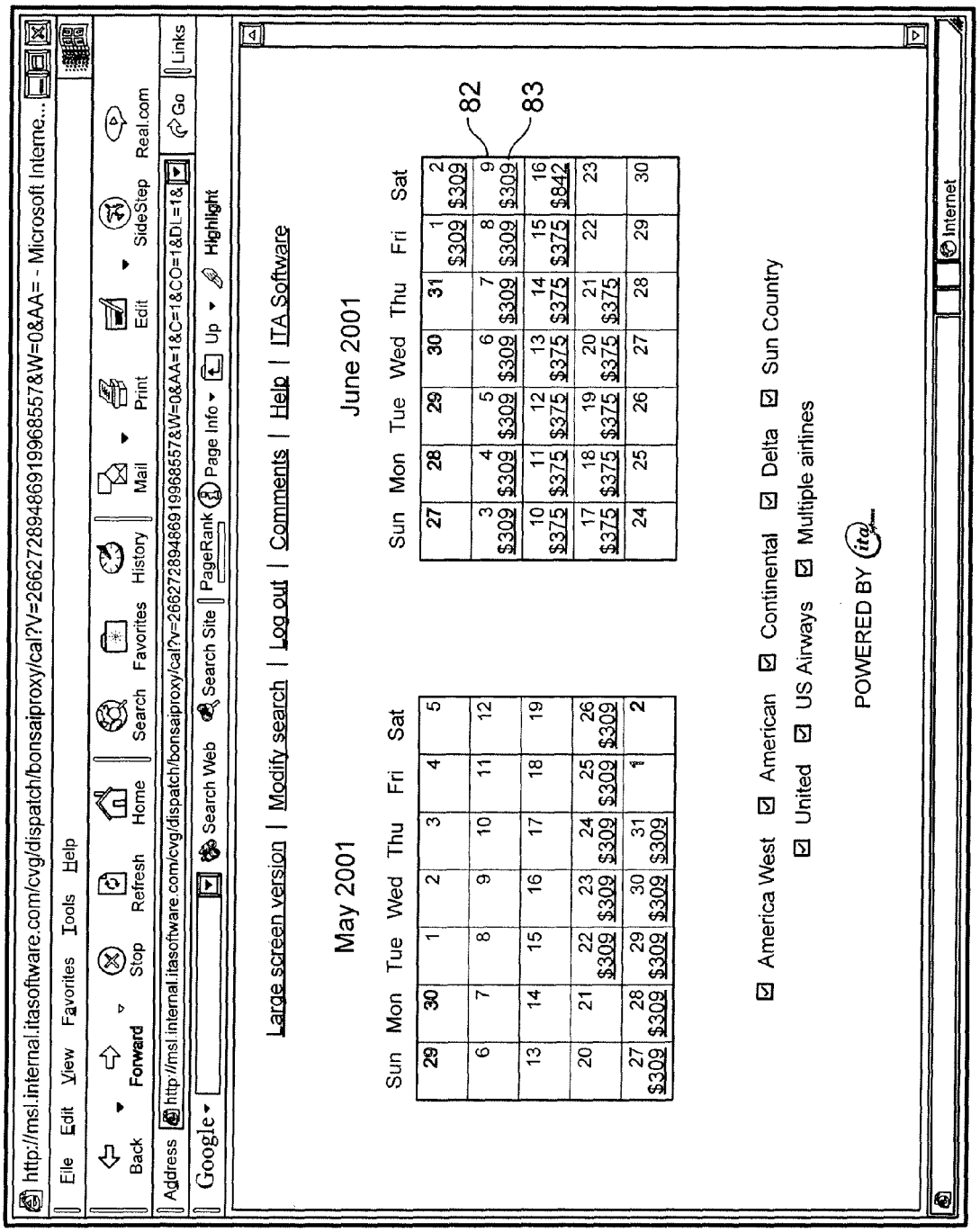
FIG. 4 is a diagram depicting a results calendar.

Referring to FIG. 4, an illustration of the calendar with results is shown. In this interface, one price 82 is displayed on each calendar day for which results have been computed. Each price is underlined to show that it is a hypertext link 83. Clicking on the link 83 brings up another web page 85 (FIG. 5).

As illustrated in FIG. 5, the web page 85 displays the results for a single day. The web page 85 provides two types of information: the details of the particular solution(s) that generated the price shown; and an overview of the other options available on that day, which may involve different routings, different carriers, different departure times, different layover lengths, and so forth. The web page 85 includes a table 87 that summarizes the travel options for a single solution set and day. The travel option summary table 87 has multiple tabs, e.g., a tab 87a that groups summary information by airlines and number of stops and a tab 87b that groups summary information by flight times. A tab (not shown) can be included to summarize travel information by airports. Other tabs can be used to summarize other travel information according to other criteria such as class of service, safety of equipment, etc.

With the airline tab 87a selected, the summary information in the table 87 is arranged in rows and columns with here enumerating the airlines that offer solutions for the date selected arranged in columns of the table as links, and each of the rows of the table 87 arranging specified travel options such as nonstop flights or one-stop flights, and so forth as links. Interior cells within the table 87 are links that correspond to prices for the solutions that match the user's airline and number of stops criteria. The table 87 displays a set of air travel options according to specified criteria, e.g., the airlines used in one or more of the travel options (displayed horizontally at the top of the table), and the number of stops or connections in the set of travel options (displayed vertically on the left of the table). Here, the travel options represented by a given table cell are those solutions which use the airline in the same column as that cell, and that have the same number of stops as the "number of stops" header in the same row as that cell. A third criteria, price (i.e. price of an airline ticket), is displayed in each cell of the table; this price is the minimum price for any of the travel solutions that are represented by a given cell.

Selecting a cell (by clicking on a URL in this case) displays, in a lower pane 89, a listing of the travel solutions for that particular cell. Each travel solution contains a 'details' URL link in the row of information devoted to that travel solution. Clicking on that link takes the user to a detailed description of that travel solution (not shown).

A general procedure to construct the summarizing tabs 87a and 87b is given below:

1) Obtain list of query-specific travel solutions from database.

2) For each criteria in travel solutions:
Enumerate bins for the criteria

For each travel solution T:
Place travel solution T into some bin
3) Given the bins computed in (2), compute which travel solutions go into intersecting bin pairs to determine what travel solutions go in what cells of the summary table.
4) Generate and display summary table given information from procedure (3).

When the flight time tab 87b is selected, the table 87 is arranged to show departure times between the origin and the destination over ranges of times for the potential days of travel in the outbound portion of the trip in rows of the table, as well as departure time for the return portion of the trip in columns of the table 87 over time ranges in the potential return days. Thus, selecting one of the outer peripheral cells of the table will bring up all flight options on a designated day in the designated time area; whereas selecting an interior one of the cells will produce the intersection of solutions for a time segment on the selected outbound date and the time segment of the selected return date. Each solutions table 87 cell displays the cost of the cheapest solutions for each pair of intersecting time segments, allowing a user to decide the most appropriate time to travel giving consideration such as cost and convenience.

Several approaches can be used to produce data for inclusion in the calendar results web pages.

Referring now to FIG. 6, an approach 90 that can be used to produce data for inclusion in the web page is shown. The approach 90 uses the original flexible-date query solution set. When the user clicks on the link associated with a given departure date on the calendar (FIG. 4 or 5), the travel application filters its current working solution set by departure date to generate the subset of solutions for that day. The link that the user clicks on is sent 92 to the web server 17. The web server 17 sends 94 a corresponding request to the calendar results display generator 66. The generator 66 issues a request 96a to the database 63 that holds the results of the original flexible-data query solution set. The database 63 returns 96b the subset of solutions for that day to the calendar results display generator 65. This subset is sent 97 to the web server and is used to generate the result page. A new calendar display is produced 98 and sent to the client system 14 where it is displayed. The advantage of this method is that it requires no further work from the search engine when the user selects a calendar day link. The disadvantage is that, given the limited computation time available to handle the original flexible date query, the subset of results on each day may not be diverse enough to populate the overview table fully.

The search engine parameters can be set so as to increase the diversity of solutions generated by the search engine. This helps ensure that each cell of the overview table is represented by at least one solution on each departure date. However, recognizing that many additional solutions are missing from the initially generated set, the interface provides a prominent link labeled, e.g., "Search for additional options like these." This link is similar to the follow-up query as discussed in FIG. 7 below; it submits a new query to the search engine in order to generate additional solutions departing on the date in which the user has expressed particular interest. The newly generated solutions are added to the solutions database for subsequent interactions.

Figure 7:
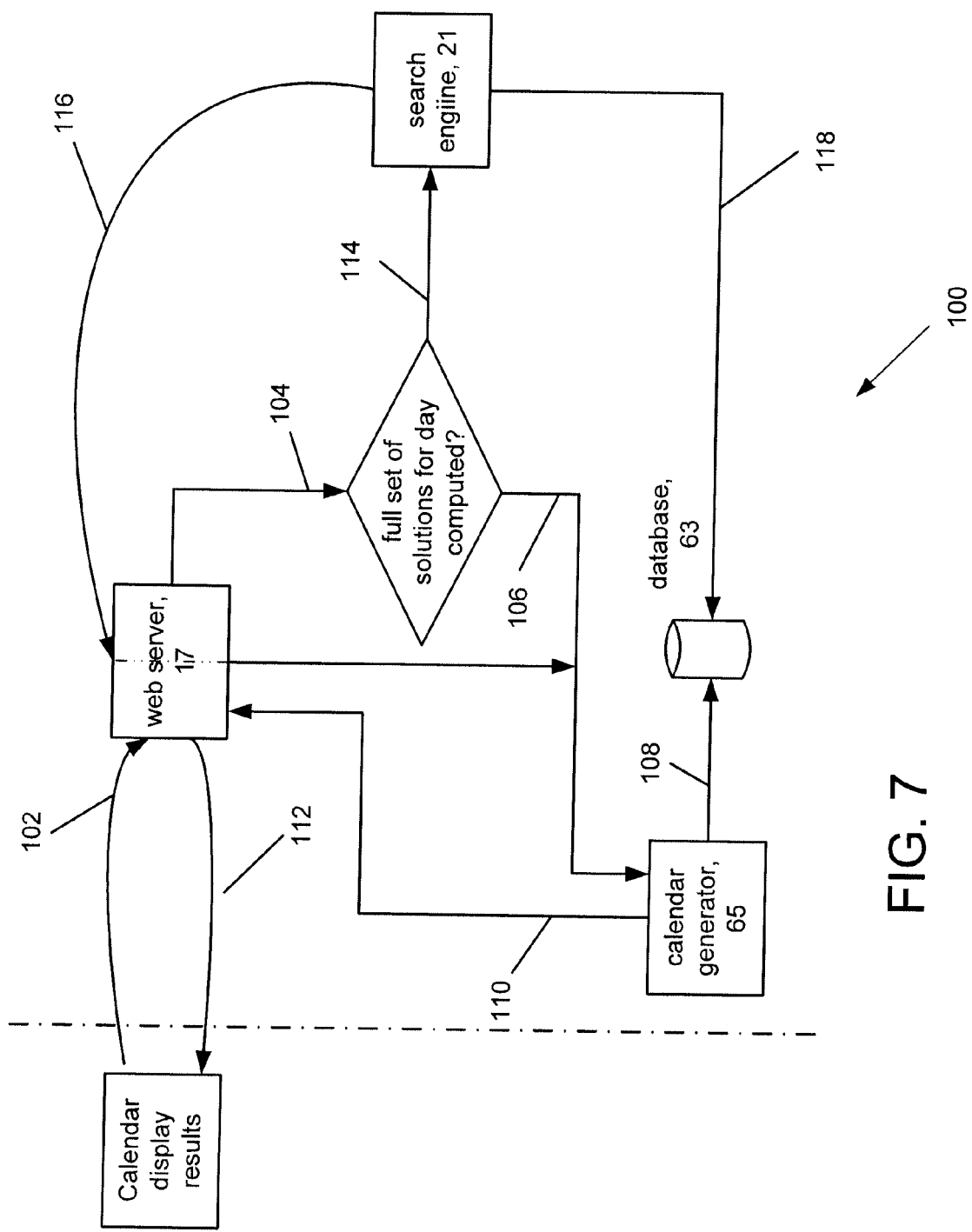

Referring to FIG. 7, another approach 100 to produce data for inclusion in the web page uses a follow-up query that is posed to the search engine. When the user clicks 102 on the link associated with a given departure date on the calendar, the travel application, via the web server 17 poses 104 a follow-up query to the search engine 21. This follow-up query constrains the search to departures on the particular date chosen, which gives the search engine 21 time to generate more flight combinations. The expanded solution set is used to populate the overview table 87 (FIG. 5). The link that the user clicks on is sent 102 to the web server 21. The web server 21 determines 104 if a full set of solutions have already been produced for this date; yes, the web server sends 106 a corresponding request to the calendar results display generator 65. The generator 65 issues 108 a request to the database 63 that holds the results of the query solution set. The database returns 110 the subset of solutions for that day to the calendar. The calendar generator 65 generates the appropriate calendar from the solution set and this subset is sent to the web server, which is sent 112 for display at the client system.

However, if the full set of solutions has not been completed the web server sends 114 a request for a single day query to the search engine. The search engine produces a diverse list of travel options according to a set of travel criteria such as carrier, departure or arrival times, time of day, origin, destination, airports and so forth. A diversity process can iterate through a set of travel criteria and select the best travel option for each criterion. When the search engine has determined a complete set of solutions, the search engine informs 116 the web server 21. The results are written 118 to the database 63 for use by the calendar generator 65 as just mentioned above.

It frequently occurs that the cheapest trip satisfying the user's query on some or all dates within the user's date range has some properties undesirable to the user. For example, the cheapest solution on some or all dates might be available only on "Undesirable Airlines", or might involve an inconvenient number of connections en route to the destination. If the prices displayed on the calendar correspond only to these undesirable solutions, the calendar is less valuable to the user.

Figure 8:
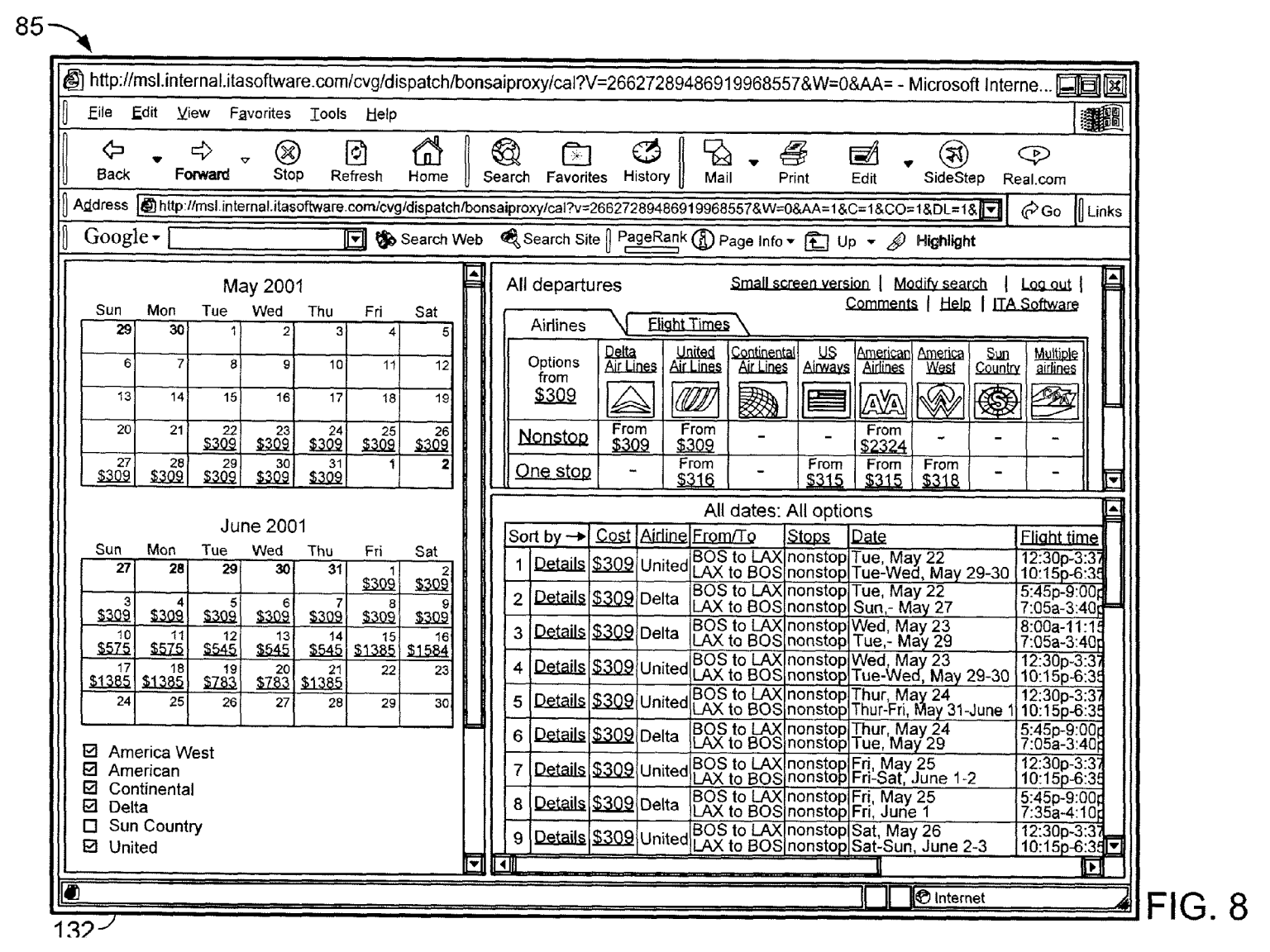

FIG. 8 discussed below is a different configuration of the results calendar interface shown in FIG. 4. In FIG. 8, clicking on a price link in one of the calendar cells displays the results for the clicked-on day to the right of the calendars, rather than bringing up a new web page with just the results for the clicked-on day. This is useful for users who have computer monitors large enough to accommodate both the calendars and the single-day information on the screen at the same time.

Referring to FIG. 8, one implementation of the results window 85 provides user-selectable filters 130 of the solution set. FIG. 8 and FIG. 4 (discussed above) include filters (to filter out airlines). The filters 130 may be used individually or in combination. When a filter 130 is selected, then the properties shown in each date cell of the calendar are updated so as to reflect the best solution for that date which passes all the selected filters. For example, the user may elect to filter out any solution that involves either "undesirable" airlines or solutions which contain two or more connections en route to the destination. Having made those selections, the user would likely observe some of the prices shown on the calendar to increase, reflecting the elimination of the undesirable solutions from the solution set. In FIG. 8, the user has clicked on the price in the calendar cell for June 8 (which can be indicated by a highlight not shown), which displays the flight options for June 8 on the right. The user also clicks on the carrier filter "SY" to filter out flights on that carrier.

The following is a partial list of criteria that may be applied as filters on the calendar's solution set:
airlines (any subset of airlines may be selected or deselected);
number of connections in the solution (e.g., nonstop, single connection, etc.)
cabin class (first, business, refundable coach, economy coach)
layover duration (filter by length of stay)

origin and destination airports (applies in cases where alternative airport choices were given in the query, e.g., LGA/JFK/EWR).

equipment types (e.g. propeller planes)

overnight flights and other undesirable departure times awkward connections such as a long stopover at an intermediate city en-route change of airport outbound and return departure times (e.g., morning, midday, afternoon, evening)

airline safety and on-time performance records.

The filters can be implemented as an advanced options link on the results page that can bring up another page (not shown) to allow users to input their preferences for these items.

When calendar filters are selected, the same filters are simultaneously applied to the single-day result page currently being displayed. In that way, the price highlighted on any given date of the calendar always corresponds to the cheapest price on that day's corresponding single-day result page.

Referring back to FIG. 6, as discussed earlier, the set of departure dates considered in a flexible-date query may be restricted by the user-entered earliest and latest departure dates, as well as by the layover specification. For example, if a user requests a trip departing between February 1 and 28, with a "long weekend" layover, then the system will produce results for only a handful of days, e.g., Thursdays and Fridays in February. Thus, the calendar of results will show prices on that set of dates only. Upon seeing those results, the user may naturally want to extend the set of possible travel dates to include additional dates. The interface can provide various types of query-extending links.

For example, on dates for which the calendar shows no associated solutions, links are provided that cause a follow-up query to be posed to the search engine, filling the gap on that date. A second type of extending link would be that on the column headings of each calendar, corresponding to the weekdays of that month, a link is provided that causes all weekdays in that month to be added to the dates under consideration. When that link is followed, any dates not already filled in are resubmitted to the search engine, filling any gaps on that weekday. A third type would be on the row headings of each calendar, corresponding to a given departure week, a link provides for an automatic follow-up query to the search engine to fill in the empty cells corresponding to days during that week. In addition, links can be provided to enable the user to add an additional month's calendar, immediately prior to or subsequent to the displayed calendar(s). When a new month is added, all dates on that month are shown as blank initially, with links provided as in (1)-(3) above to fill in the blank dates. Alternatively, the system may submit a follow-up query to fill part or all of the newly displayed month with solutions.

The departure date information of the query is modified when the query is resubmitted. All other query fields, such as the passenger information, airport preferences, and layover specification, are preserved. As before, the newly generated solutions are added to the solutions database for subsequent interactions.

Search Engine Parameters for Flexible-Date Queries

Although using a layover specification helps to constrain the amount of searching that the search engine performs, flexible-date queries still involve searching many more flight options than a standard, single-day query. As such, the flexible date queries are likely to require more computation time. Several techniques can be used to limit the search, while not compromising the ability of the system to generate useful, fully validated solutions.

One such technique would be to limit the search according to flight-itinerary diversity. In normal, single-day operation, a search engine may consider as many as 1000 of the most convenient flight combinations between the user's origin and destination. To handle flexible-date queries quickly, this number is reduced to a few dozen per day, representing only the most convenient options on a sampling of carriers.

Another solution would be to limit the search according to seat availability. When there are multiple flight-combinations on a given day on a given airline, the one with the cheapest price is usually the one with the most seat availability. The system checks the seat availability on all flight-combination options and prunes out those with lower seat availability. The result is that the search space shrinks, while the best answer for each airline on each date is most likely preserved. A third possibility is to limit the search by fare. Airlines typically publish dozens, and sometimes as many as hundreds, of different fares for each city-pair that they serve. Significant reduction in computations can be attained by eliminating some of these fares from consideration—for example, all first-class and business-class fares.

Another way would be to limit the search by construction. On an itinerary such as United:BOS-CHI-LAX, it is usually possible to fare the itinerary either as a BOS-LAX "through fare", or as the sum of a "BOS-CHI" fare and a "CHI-LAX" fare. Eliminating the latter faring, and requiring only through fares to be used in the search would result in significant reductions in computations.

An additional technique would be to limit the search by priceable unit type. Airline fare construction principles require all tickets to be broken down into sub-units called priceable units, of which there are four types: one-way, round-trip, open-jaw, and circle-trip. Open-jaw and circle-trip units sometimes result in the cheapest solution even on a simple round-trip journey, but usually one-way and round-trip priceable-units suffice. The faring process can be sped up by eliminating open-jaw and circle-trip priceable units from consideration.

Another technique to reduce latency of low fare searching uses query splitting. Query splitting involves dividing the query among several different processors in a "farm" of low-fare search engines, as discussed in FIG. 9 below.

Figure 9:
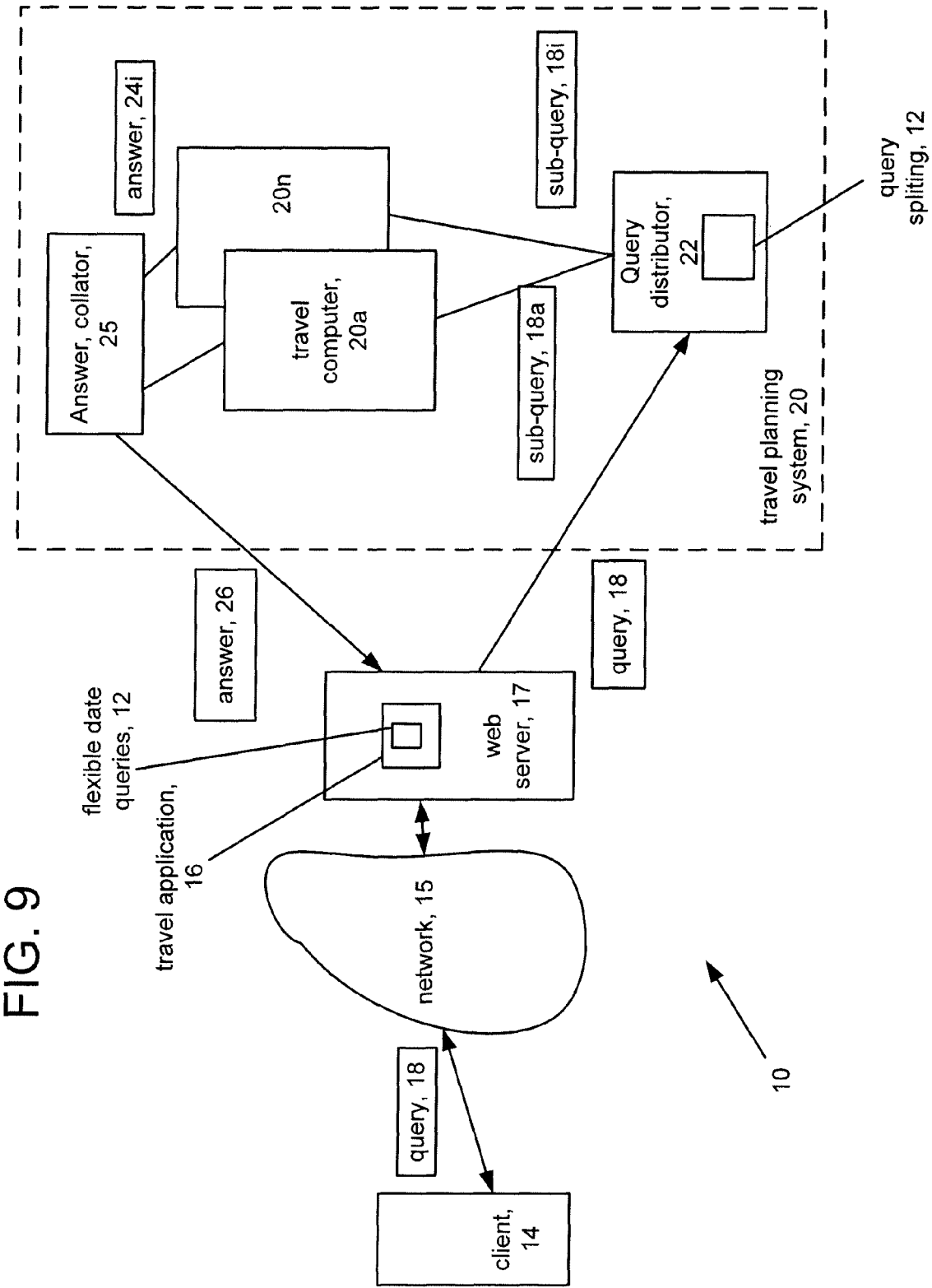
FIG. 9 is a block diagram depicting a travel planning system using split queries.

Referring to FIG. 9, in some embodiments of the travel planning system 20, the travel planning system includes a query distributor 22 that alters the query 18 to produce sub-queries 18a-18i that are distributed to various travel planning computers 20a-20n, where n does not necessarily equal i. The travel planning computers 20a-20n execute the sub-queries 18a-18i concurrently to produce answers 24a-24i. The answers 24a-24i to these sub-queries 18a-18i are sent back to the user, via the web server 17. In one embodiment, the answers 24a-24i are sent to an answer collator 25, which merges the answers 24a-24i into a composite answer 26 and sends that answer 26 to the web server 17 for transmission to the client 14. The travel planning system includes a search engine or process 21 that is run on each of the travel planning computers 20a-20n.

The answers for each sub-query may be collected and organized by the answer collator 25 using a number of different techniques. If the form of the sub-query results is a simple list of travel options, the collation process used by the answer collator 25 may simply involve concatenating the answers from each sub-query. However more complex collations schemes are possible, such as selecting a subset of answers from each sub-query (such as the cheapest travel options from amongst all of the answers and so forth). Alternatively, if the query division process 12 produces sub-queries that overlap, the collation process 25 could remove duplicate answers. In the case where the travel planning computers produce answers in other forms, such as a pricing graph representation, other methods of collation may be used. For example, multiple pricing graphs can be merged into one by joining them with an OR node. It may also be that no collation process is used, so that answers for the different sub-queries are returned to the travel application as soon as they are available, rather than waiting for all sub-queries to complete.

When queries are split using this technique, the user-interface can display the results on the calendar progressively, as the sub-queries finish and results are returned using dynamically generated animated-GIF images and image maps.

Algorithms for performing such query splitting are described in co-pending patent application Ser. No. 10/272, 426 Filed Oct. 16, 2002 Entitled "Dividing a Travel Query Into Sub-Queries" by Carl G. de Marcken assigned to the assignee of the present invention (pending).

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented method of processing flexible-date queries, the method comprises:
   receiving by one or more computer systems a flexible date query, the flexible date query including a field for entering a departure date for a first portion of a trip and a field for entering a flexible return for a subsequent portion of the trip with the flexible return specified as a description of a desired layover at a destination from where the subsequent leg of the trip originates, and with the description of the layover defined by words or phrases;
   determining, by one or more computer systems based in part on the description of the desired layover, a set of solutions that satisfy the flexible date query, using the desired layover to provide fares and flights for the set of solutions; and
   sending by one or more computer systems the set of solutions to a device to render the solutions on a display associated with the device.

2. The method of claim 1, further comprising:
   sending a user interface, the user interface comprising a user entry field that allows a user to enter the layover description that includes a description of duration of the layover at the destination of a trip, a field for an origin of travel and a field for the destination of travel.

3. The method of claim 1 wherein the interface is a graphical user interface that is divided into a plurality of panes, with one of the plurality of panes corresponding to a flexible date query form to enter flexible date queries.

4. The method of claim 3 wherein the pane corresponding to the flexible date query form to enter flexible date queries further includes a field to enter an earliest departure date.

5. The method of claim 3 wherein the pane corresponding to the flexible date query form to enter flexible date queries further includes a field to enter the origin and a field to enter the destination.

6. The method of claim 1 wherein the layover description imposes constraints on the departure date.

7. The method of claim 6, wherein the constraint is leaving on only certain days of the week.

8. The method of claim 1 further comprising
   storing the set of solutions in a database according to departure date; and
   augmenting the database with additional results from, additional follow-up queries sent to the one or more computers.

9. The method of claim 1 wherein the departure date for the first portion of the trip is a flexible departure date.

10. The method of claim 1 further comprising:
    sending the set of solutions to a user as a calendar having a link in a cell representing a property of at least one solution found for a day corresponding to the cell, with the link when selected rendering additional details of the at least one solution found for that day.

11. The method of claim 1 further comprising:
    augmenting the database with solutions for commonly traveled markets and layover lengths using an offline process that runs periodically.

12. The method of claim 1 further comprising:
    filtering the solution set according to user specified parameters.

13. The method of claim 1 further comprising:
    filtering the solution set to allow a user to select a particular airline or set of airlines, causing the calendar's prices to be updated so as to reflect the complete price of the cheapest ticket originating on each day using only the selected airline or airlines.

14. The method of claim 10 further comprising:
    searching the set of solutions resulting from the flexible date query to generate a subset of solutions for the day when a user selects a link.

15. The method of claim 10 further comprising:
    processing a follow-up query to produce data for inclusion in a subset of solutions, in response to the user selecting the link associated with a given departure date on the calendar.

16. A computer program product stored on a computer readable medium for processing flexible-date queries comprising instructions to cause a processor to:
    receive a flexible date query, the flexible date query including a departure date for a first portion of a trip and a flexible return for a subsequent portion of the trip with the flexible return specified as a description of a traveler's desired layover at a destination, the description of the layover being defined by words or phrases;
    determine, based in part on the description of the traveler's desired layover, a set of solutions that satisfy the flexible date query, using the desired layover to provide fares and flights for the set of solutions;
    send the set of solutions to a device to render the solutions.

17. The computer program product of claim 16 further comprising instructions to:
    store the set of solutions in a database according to departure date.

18. The computer program product of claim 16 further comprising instructions to:
    send the set of solutions as a calendar having a link in a cell representing a property of at least one solution found for a day corresponding to the cell, with the link when selected rendering additional details of the at least one solution found for that day.

19. The computer program product of claim 16 further comprising instructions to:
    filter the set of solutions according to user specified parameters.

20. The computer program product of claim 16 further comprising instructions to:
    filter the set of solutions to allow the user to select a particular airline or set of airlines, causing the calendar's prices to be updated to reflect the complete price of the cheapest ticket originating on each day using only the selected airline or airlines.

21. The computer program product of claim 18 further comprising instructions to:
search the set of solutions resulting from the flexible date query to generate a subset of solutions for the day corresponding to the link.

22. The computer program product of claim 21 further comprising instructions to:
process a follow-up query to produce data for inclusion in the subset of solutions, in response to the user selecting the link associated with a given departure date on the calendar.

23. The computer program product of claim 16 further comprising instructions for causing a computer to:
send a user interface comprising a field to enter the layover description that describes the duration of the layover at a destination, a field to enter an origin of travel and a field to enter the destination of travel.

24. The computer program product of claim 23 wherein the layover description imposes constraints on the departure date.

25. The computer program product of claim 24 wherein a first one of the other constraints is leaving on only certain days of the week.

26. The computer program product of claim 23 wherein the instructions to send a user interface, comprise instructions to:
produce the user interface as a graphical user interface divided into a plurality of panes, with one of the plurality of panes corresponding to a flexible date query form to enter flexible date queries.

27. The computer program product of claim 26 wherein the instructions to send the pane corresponding to the flexible date query form to enter flexible date queries further includes instructions to render a field to enter an earliest departure date.

28. The computer program product of claim 26 wherein the instructions to send the pane corresponding to the flexible date query form to enter flexible date queries further includes instructions to render a field to enter an origin and a field to enter a destination.

29. An travel planning system comprising:
a processor device;
memory coupled to the processor device; and
a computer readable storage device storing a computer program product for processing flexible-date queries comprises instructions to cause the processor to:
receive a flexible date query, the flexible date query including a departure date for a first portion of a trip and a flexible return for a subsequent portion of the trip with the flexible return specified as a description of a traveler's desired layover at a destination, the description of the layover being defined by words or phrases;
determine, based in part on the description of the traveler's desired layover, a set of solutions that satisfy the flexible date query, using the desired layover to provide fares and flights for the set of solutions;
send the set of solutions to a device to render the solutions.

30. The system of claim 29 wherein the computer program product further comprises instructions to:
store the set of solutions in a database according to departure date.

31. The system of claim 29 wherein the computer program product further comprises instructions
send the set of solutions to the user as a calendar having a link in a cell representing a property of at least one solution found for a day corresponding to the cell, with the link when selected rendering additional details of the at least one solution found for that day.

32. The system of claim 31 wherein the computer program product further comprises instructions:
filter the set of solutions according to user specified parameters.

33. The system of claim 31 wherein the computer program product further comprises instructions:
filter the set of solutions to allow the user to select a particular airline or set of airlines, causing the calendar's prices to be updated to reflect the complete price of the cheapest ticket originating on each day using only the selected airline or airlines.

34. The system of claim 31 wherein the computer program product further comprises instructions to:
search the set of solution resulting from the flexible date query to generate the subset of solutions for the day corresponding to the link.

35. The system of claim 29 wherein the computer program product further comprises instructions to
process a follow-up query to produce data for inclusion in the subset of solutions, in response to the user selecting the link associated with a given departure date on the calendar.

36. The system of claim 29 wherein the computer program product further comprises instructions to:
send a user interface comprising a field to enter the layover description that describes the duration of the layover at a destination, a field to enter an origin of travel and a field to enter the destination of travel.

37. The system of claim 36 wherein the layover description imposes constraints on the departure date for the return portion of the trip.

38. The system of claim 37 wherein a first one of the other constraints is leaving on only certain days of the week.

39. The system of claim 36 wherein the computer program product further comprises instructions to:
produce the user interface as a graphical user interface divided into a plurality of panes, with one of the plurality of panes corresponding to a flexible date query form to enter flexible date queries.

40. The system of claim 39 wherein the pane corresponding to the flexible date query form to enter flexible date queries further includes instructions to render a field to enter an earliest departure date.

41. The system of claim 39 wherein the pane corresponding to the flexible date query form to enter flexible date queries further includes instructions to render a field to enter an origin and a field to enter a destination.

* * * * *